(12) United States Patent
Yoon et al.

(10) Patent No.: US 10,658,654 B2
(45) Date of Patent: May 19, 2020

(54) COMPOSITE ANODE ACTIVE MATERIAL, ANODE INCLUDING THE SAME, AND LITHIUM SECONDARY BATTERY INCLUDING THE ANODE

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Dukhyoung Yoon, Yongin-si (KR); Sangkook Mah, Seoul (JP)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 192 days.

(21) Appl. No.: 15/149,542

(22) Filed: May 9, 2016

(65) Prior Publication Data

US 2017/0117535 A1     Apr. 27, 2017

(30) Foreign Application Priority Data

Oct. 23, 2015   (KR) .................. 10-2015-0148030

(51) Int. Cl.
| | |
|---|---|
| H01M 4/64 | (2006.01) |
| H01M 4/134 | (2010.01) |
| H01M 4/38 | (2006.01) |
| H01M 4/62 | (2006.01) |
| H01M 4/1395 | (2010.01) |
| H01M 4/485 | (2010.01) |

(Continued)

(52) U.S. Cl.
CPC .......... *H01M 4/134* (2013.01); *H01M 4/131* (2013.01); *H01M 4/133* (2013.01); *H01M 4/1391* (2013.01); *H01M 4/1393* (2013.01); *H01M 4/1395* (2013.01); *H01M 4/366* (2013.01); *H01M 4/386* (2013.01); *H01M 4/485* (2013.01); *H01M 4/587* (2013.01); *H01M 4/5825* (2013.01); *H01M 4/625* (2013.01); *H01M 4/64* (2013.01)

(58) Field of Classification Search
None
See application file for complete search history.

(56) References Cited

U.S. PATENT DOCUMENTS

| | | | |
|---|---|---|---|
| 6,737,191 B2 * | 5/2004 | Gan ................. | H01M 4/06 429/128 |
| 8,247,101 B2 | 8/2012 | Inagaki et al. | |

(Continued)

FOREIGN PATENT DOCUMENTS

| | | |
|---|---|---|
| JP | 2013-041844 A | 2/2013 |
| KR | 1020100066026 A | 6/2010 |

(Continued)

OTHER PUBLICATIONS

Park et al., "Effect of Conductive Additives on the Structural and Electrochemical Properties of Li4Ti5O12 Spinel", Bull. Korean Chem. Soc., vol. 33, No. 12, 2012, pp. 4059-4062.

(Continued)

*Primary Examiner* — Tracy M Dove
(74) *Attorney, Agent, or Firm* — Cantor Colburn LLP (57) ABSTRACT

A composite anode active material includes: a core comprising silicon; and a carbonaceous shell, wherein the carbonaceous shell includes a carbonaceous material and lithium titanium oxide.

17 Claims, 8 Drawing Sheets

(51) Int. Cl.
*H01M 4/133* (2010.01)
*H01M 4/131* (2010.01)
*H01M 4/36* (2006.01)
*H01M 4/58* (2010.01)
*H01M 4/587* (2010.01)
*H01M 4/1393* (2010.01)
*H01M 4/1391* (2010.01)

(56) References Cited

U.S. PATENT DOCUMENTS

| | | | |
|---|---|---|---|
| 9,083,021 B2 | 7/2015 | Chang et al. | |
| 2010/0143804 A1 | 6/2010 | Mah et al. | |
| 2013/0059203 A1 | 3/2013 | Hong et al. | |
| 2014/0057176 A1* | 2/2014 | Park | H01M 4/366 |
| | | | 429/220 |
| 2014/0212694 A1 | 7/2014 | Park et al. | |
| 2015/0017527 A1 | 1/2015 | Lee et al. | |
| 2015/0194669 A1* | 7/2015 | Inoue | H01M 4/134 |
| | | | 429/217 |
| 2016/0172665 A1* | 6/2016 | Zhou | H01M 4/366 |
| | | | 429/338 |

FOREIGN PATENT DOCUMENTS

| | | |
|---|---|---|
| KR | 1020110124728 A | 11/2011 |
| KR | 1020120081556 A | 7/2012 |
| KR | 1020140096915 A | 8/2014 |
| KR | 1020150008327 A | 1/2015 |
| KR | 1020150015086 A | 2/2015 |
| KR | 1020150047274 A | 5/2015 |
| WO | 2010137753 A1 | 12/2010 |

OTHER PUBLICATIONS

Patoux et al., "Lithium Insertion into Titanium Phosphates, Silicates, and Sulfates", Chem. Mater. vol. 14, 2002, pp. 5057-5068.

* cited by examiner

COMPOSITE ANODE ACTIVE MATERIAL, ANODE INCLUDING THE SAME, AND LITHIUM SECONDARY BATTERY INCLUDING THE ANODE

CROSS-REFERENCE TO RELATED APPLICATION

This application claims priority to and the benefit of Korean Patent Application No. 10-2015-0148030, filed on Oct. 23, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a composite anode active material, an anode including the same, and a lithium secondary battery including the anode.

2. Description of the Related Art

Graphite has a specific capacity of about 360 mAh/g, while silicon has a specific capacity of about 3600 mAh/g, which is about ten times greater than that of graphite. Thus silicon is potentially a desirable next generation negative active material. However, when silicon is charged and discharged in a battery, the binding force between active materials may be reduced, and the silicon particles themselves may crack, and a solid electrolyte interface (SEI) layer is continuously formed due to repeated volumetric expansion and shrinkage of the silicon particles, causing drastic lifespan deterioration. Therefore, in order to commercialize silicon in a lithium secondary battery, suppression of irreversible reactions which occur from charging and discharging is desired. Thus there remains a need for an improved anode material.

SUMMARY

Provided is a composite anode active material including a core including silicon and a carbonaceous shell.

Provided is an anode including the composite anode active material.

Provided is a lithium secondary battery including the anode.

Additional aspects will be set forth in part in the description which follows and, in part, will be apparent from the description, or may be learned by practice of the presented exemplary embodiments.

According to an aspect of an exemplary embodiment, a composite anode active material includes a core including silicon and a carbonaceous shell, wherein the carbonaceous shell includes a carbonaceous material and lithium titanium oxide.

The lithium titanium oxide may be dispersed in the carbonaceous material.

The core may include at least one selected from Si, $SiO_x$ where $0<x<2$, a Si—C composite, and a Si alloy.

The Si alloy may include at least one selected from $Fe_3Si$, $Fe_2Si$, $Fe_5Si_3$, $FeSi$, $FeSi_2$, $FeSi_3$, $AlSi_2$, $Cu_5Si$, $Mg_2Si$, $NiSi$, $TiSi_2$, and $Si_7Ti_4Ni_4$.

The lithium titanium oxide may be an inert material which does not intercalate or deintercalate lithium ions during charging and discharging of a lithium secondary battery, or may be a precursor of the inert material.

The lithium titanium oxide may be electrically conductive.

The lithium titanium oxide may include a compound represented by Formula 1 below:

$$Li_{x+3}Ti_yO_{12} \qquad \text{Formula 1}$$

wherein $2.4 \leq x \leq 4.2$ and $4.8 < y \leq 6.6$.

The lithium titanium oxide may include a compound represented by Formula 2 below:

$$Li_xTi_yO_{12} \qquad \text{Formula 2}$$

wherein $2.4 \leq x \leq 4.2$ and $4.8 < y \leq 6.6$.

The lithium titanium oxide may include a compound represented by Formula 3 below:

$$Li_xTi_yM_zO_n \qquad \text{Formula 3}$$

wherein $1 \leq x \leq 4$, $1 \leq y \leq 5$, $0 \leq z \leq 3$, $3 \leq n \leq 12$, and M is at least one element selected from lithium (Li), magnesium (Mg), aluminum (Al), calcium (Ca), strontium (Sr), chromium (Cr), vanadium (V), iron (Fe), cobalt (Co), nickel (Ni), zirconium (Zr), zinc (Zn), silicon (Si), phosphorus (P), sulfur (S), yttrium (Y), niobium (Nb), gallium (Ga), tin (Sn), molybdenum (Mo), tungsten (W), barium (Ba), lanthanum (La), cerium (Ce), silver (Ag), tantalum (Ta), hafnium (Hf), ruthenium (Ru), bismuth (Bi), antimony (Sb), and arsenic (As).

The lithium titanium oxide may include at least one selected from $Li_2TiO_3$, $Li_4Ti_5O_{12}$, $Li_2Ti_3O_7$, $LiCrTiO_4$, $LiFeTiO_4$, $Li_2TiSiO_5$, $LiTiPO_5$, and $LiTi_2(PO_4)_3$.

The carbonaceous shell may further include a titanium-containing compound represented by Formula 4 below:

$$Ti_yM_zO_n \qquad \text{Formula 4}$$

wherein $1 \leq y \leq 5$, $0 \leq z \leq 2$, $1 \leq n \leq 7$, and M is at least one element selected from Li, Mg, Al, Ca, Sr, Cr, V, Fe, Co, Ni, Zr, Zn, Si, P, S, Y, Nb, Ga, Sn, Mo, W, Ba, La, Ce, Ag, Ta, Hf, Ru, Bi, Sb, and As.

The titanium-containing compound may include at least one compound selected from $TiO_2$, $TiSO_5$, and $TiP_2O_7$.

The carbonaceous material may include crystalline carbon or an amorphous carbon.

An amount of the carbonaceous shell may be in a range of about 0.1 part by weight to about 50 parts by weight, with respect to 100 parts by weight of the core.

An amount of the lithium titanium oxide may be in a range of about 0.1 part by weight to about 50 parts by weight, with respect to 100 parts by weight of the carbonaceous material.

According to an aspect of another exemplary embodiment, an anode includes the composite anode active material.

The anode may further include another anode active material.

According to an aspect of another exemplary embodiment, a lithium secondary battery includes the anode.

Also disclosed is a method of preparing a composite anode active material, the method including: providing a core including silicon; and contacting the core with a carbonaceous material and lithium titanium oxide to form a carbonaceous shell including the carbonaceous material and the lithium titanium oxide on the core to prepare the composite anode active material.

Also disclosed is a method of protecting a silicon anode material, the method including: providing a composite anode material including a core comprising silicon, and a carbonaceous shell, wherein the carbonaceous shell comprises a carbonaceous material and lithium titanium oxide;

and intercalating lithium into the lithium titanium oxide to form an inert material on a surface of the core to protect the silicon anode material.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. "Or" means "and/or."

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite anode active material, an anode, and a lithium secondary battery according to an embodiment are disclosed in further detail with reference to the accompanying drawings.

A composite anode active material according to an embodiment includes a core comprising silicon and a carbonaceous shell. The carbonaceous shell includes a carbonaceous material and lithium titanium oxide.

The term "composite" as used herein refers to a material made from two or more constituent materials each of which has different physical or chemical properties and which remain separate and distinct on a macroscopic or microscopic scale within the finished structure of the composite, and wherein the composite has different properties from those of each constituent material alone. In addition, as used herein, the term "lithium titanium oxide" refers to a lithium-, titanium- and oxygen-containing oxide that optionally further includes or does not include another element.

Thus the term "composite anode active material" as used herein indicates the core and the carbonaceous shell form a composite. The core serves to intercalate and deintercalate lithium ions.

While not wanting to be bound by theory, the core may include at least one selected from Si, $SiO_x$ where $0<x<2$, a Si—C composite, and a Si alloy.

The Si alloy may include at least one selected from $Fe_3Si$, $Fe_2Si$, $Fe_5Si_3$, $FeSi$, $FeSi_2$, $FeSi_3$, $AlSi_2$, $Cu_5Si$, $Mg_2Si$, $NiSi$, $TiSi_2$, and $Si_7Ti_4Ni_4$.

The core may have a particle size of about 1 nanometer (nm) to about 100 nm, about 2 nm to about 80 nm, or about 4 nm to about 60 nm. The particle size may be a particle size as determined by light scattering. Silicon particles having a size of 5 nm to 25 nm are specifically mentioned.

Also, and while not wanting to be bound by theory, the carbonaceous shell serves to prevent the core from directly contacting an electrolyte and conducts lithium ions.

The carbonaceous material is understood to suppress an irreversible reaction of the core which is understood to occur upon repeated volumetric expansion and shrinkage due to repeated charging and discharging, thereby providing a composite anode active material with enhanced electrochemical properties. In particular, the carbonaceous material is understood to suppress the weakening of a binding strength between materials in the core, breakdown of the materials in the core, and continuous formation of a solid electrolyte interface (SEI) layer, due to repeated volumetric expansion and shrinkage during charging and discharging.

The carbonaceous material may comprise at least one selected from crystalline carbon and amorphous carbon.

The crystalline carbon may comprise at least one selected from natural graphite having an amorphous shape, a plate shape, a flake shape, a sphere shape, and a fiber shape; and at least one selected from artificial graphite, such as artificial graphite prepared by carbonization of a coal-based pitch, a petroleum-based pitch, or the like. Examples of the amorphous carbon include, but are not limited to, soft carbon, hard carbon, mesophase pitch carbide, and calcined coke. A combination comprising at least one of the foregoing may be used.

The lithium titanium oxide may be dispersed in the carbonaceous material.

The lithium titanium oxide may include an inert material which does not intercalate or deintercalate lithium ions during charging and discharging of a lithium secondary battery, or a precursor of the inert material.

The inert material does not deintercalate lithium and continuously retains lithium ions included in the inert material under certain conditions (i.e., conditions under which a discharge cut-off voltage remains at 1.5 V or less) during discharging, thereby having high lithium ion conductivity.

The precursor of the inert material may have high lithium ion conductivity by, after intercalating lithium ions during charging, continuously retaining the intercalated lithium ions under certain conditions (e.g., conditions under which a discharge cut-off voltage remains at 1.5 V or less) even during discharging.

Thus, and while not wanting to be bound by theory, the lithium titanium oxide is understood to reduce the resistance of a battery including the composite anode active material, whereby the battery may have enhanced lifespan characteristics.

Thus to protect a silicon anode material, a carbonaceous shell comprising the carbonaceous material and the lithium titanium oxide may be disposed on a core comprising silicon, and then lithium intercalated into the lithium titanium oxide to form the inert material.

In an embodiment, wherein the inert material may have an oxidation potential of greater than 4.5 volts versus $Li/Li^+$, greater than 4.4 volts versus $Li/Li^+$, or greater than 4.3 volts versus $Li/Li^+$. Also, the inert material may have a reduction potential of less than 1 volt versus $Li/Li^+$, 0.5 volts versus $Li/Li^+$, or 0 volts versus $Li/Li^+$.

In addition, the lithium titanium oxide does not participate in the formation of a film that may increase the resistance of a battery and thus high capacity may be maintained even at high rates.

The inert material may be represented by Formula 1 below:

$$Li_{x+3}Ti_yO_{12} \qquad \text{Formula 1}$$

wherein $2.4 \leq x \leq 4.2$ and $4.8 < y \leq 6.6$.

For example, the inert material of Formula 1 may be formed by intercalation of lithium ions into a lithium titanium oxide represented by Formula 2 below when a battery is first charged and wherein the inert material Formula 1 does not intercalate or deintercalate lithium ions any longer during repeated charging and discharging, and thus may maintain the composition of Formula 1.

For example, when a battery including an anode including the composite anode active material is discharged, lithium ions intercalated during charging are deintercalated in the case of the core and the carbonaceous material, while the lithium ions may not be deintercalated under particularly set discharge cut-off voltage conditions (e.g., 1.5 V or less) in the case of the inert material of Formula 1. Thus, the inert material of Formula 1 may maintain its chemical structure even after repeated charging and discharging.

The inert material of Formula 1 may be formed by intercalation of lithium ions into lithium titanate represented by Formula 2 below:

$$Li_xTi_yO_{12} \qquad \text{Formula 2}$$

wherein $2.4 \leq x \leq 4.2$ and $4.8 < y \leq 6.6$.

In other words, the lithium titanate of Formula 2 may be a precursor of the inert material of Formula 1.

For example, the inert material of Formula 1 may be $Li_7Ti_5O_{12}$ formed by intercalation of lithium ions into $Li_4Ti_5O_{12}$, which is a type of lithium titanate of Formula 2.

The lithium titanium oxide may have suitable electrical conductivity, and may have an electrical conductivity of at least 10 Siemens per meter, at least 100 Siemens per meter, or at least 1000 Siemens per meter. In particular, the lithium titanium oxide may act as a conductive agent and thus may reduce the resistance of a battery including an anode including the composite anode active material. Thus a separate conductive agent other than the lithium titanium oxide may be omitted from an anode including the composite anode active material.

The lithium titanium oxide may include a compound represented by Formula 3 below:

$$Li_xTi_yM_zO_n \quad \text{Formula 3}$$

wherein 1≤x≤4, 1≤y≤5, 0≤z≤3, 3≤n≤12 and M is at least one element selected from lithium (Li), magnesium (Mg), aluminum (Al), calcium (Ca), strontium (Sr), chromium (Cr), vanadium (V), iron (Fe), cobalt (Co), nickel (Ni), zirconium (Zr), zinc (Zn), silicon (Si), phosphorus (P), sulfur (S), yttrium (Y), niobium (Nb), gallium (Ga), tin (Sn), molybdenum (Mo), tungsten (W), barium (Ba), lanthanum (La), cerium (Ce), silver (Ag), tantalum (Ta), hafnium (Hf), ruthenium (Ru), bismuth (Bi), antimony (Sb), and arsenic (As)

The lithium titanium oxide may include at least one selected from $Li_2TiO_3$, $Li_4Ti_5O_{12}$, $Li_2Ti_3O_7$, $LiCrTiO_4$, $LiFeTiO_4$, $Li_2TiSiO_5$, $LiTiPO_5$, and $LiTi_2(PO_4)_3$. For example, the lithium titanium oxide may be $Li_4Ti_5O_{12}$.

The carbonaceous shell may further include a titanium-containing compound represented by Formula 4 below:

$$Ti_yM_zO_n \quad \text{Formula 4}$$

wherein 1≤y≤5, 0≤z≤2, 1≤n≤7, and M is at least one element selected from Li, Mg, Al, Ca, Sr, Cr, V, Fe, Co, Ni, Zr, Zn, Si, P, S, Y, Nb, Ga, Sn, Mo, W, Ba, La, Ce, Ag, Ta, Hf, Ru, Bi, Sb, and As.

In particular, the titanium-containing compound may include at least one oxide selected from $TiO_2$, $TiSO_5$, and $TiP_2O_7$.

The titanium-containing compound may be dispersed in the carbonaceous material.

While not wanting to be bound by theory, it is understood that the compounds of Formulae 1 to 4 increase the density of an anode active material layer including the composite anode active material, and also retain an appropriate level of porosity in the anode active material layer, thereby enhancing wettability with respect to an electrolyte and, as a result, high-rate characteristics and output characteristics of a battery may be provided.

The amount of the carbonaceous shell may be in the range of about 0.1 parts by weight to about 50 parts by weight, about 1 part by weight to about 40 parts by weight, or about 2 parts by weight to about 30 parts by weight, based on 100 parts by weight of the core. When the amount of the carbonaceous shell is within the range described above, a battery with high charge/discharge efficiency, high discharge capacity, and excellent lifespan characteristics may be obtained.

The amount of the lithium titanium oxide (LTO) may be in the range of about 0.1 parts by weight to about 50 parts by weight, about 1 parts by weight to about 40 parts by weight, or about 2 parts by weight to about 30 parts by weight, with respect to 100 parts by weight of the carbonaceous material (e.g., pitch). When the amount of the lithium titanium oxide is within the range described above, a battery with further enhanced lifespan characteristics may be obtained.

The amount of the titanium-containing compound may be in the range of about 0.1 parts by weight to about 50 parts by weight, about 1 parts by weight to about 40 parts by weight, or about 2 parts by weight to about 30 parts by weight, with respect to 100 parts by weight of the carbonaceous material (e.g., pitch). When the amount of the titanium-containing compound is within the range described above, the lithium storage capacity of an anode may not decrease and high-rate characteristics may be enhanced even at a high density of an anode active material layer.

The composite anode active material may be further treated with a selective etchant.

When the composite anode active material is treated with a selective etchant, a portion of the core may be removed, and in an embodiment, an entirety of the core is removed, and thus pores may be formed inside the composite. In an embodiment, about 1% to about 100%, or about 20% to about 99%, or about 40% to about 95% of the core is removed by the selective etchant. The selective etchant may include at least one selected from buffered oxide etchant (BOE), HF, HCl, and NaOH.

Thus, the core may be porous. In this case, the core may have a porosity of about 1% to about 10%, about 2% to about 9%, or about 3% to about 8%.

Figure 1:
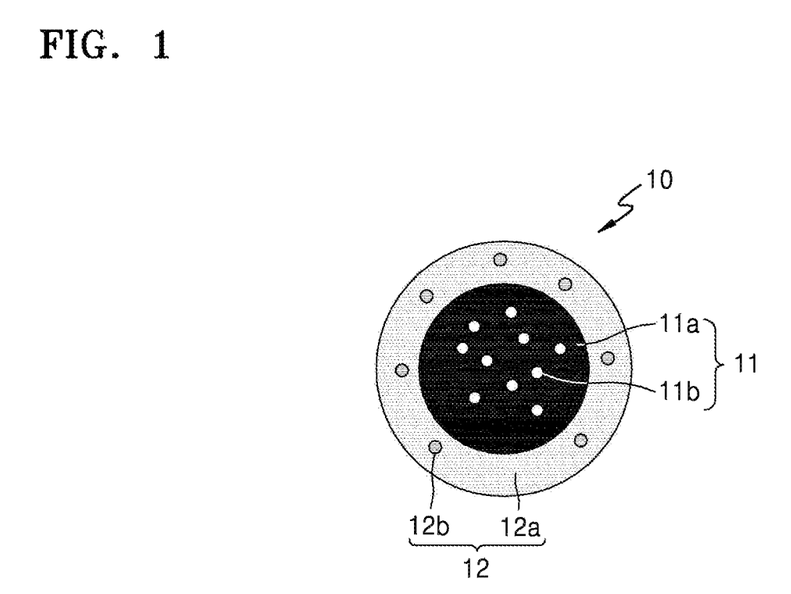
FIG. 1 is a schematic view of a composite anode active material according to an exemplary embodiment.

FIG. 1 is a schematic view of a composite anode active material 10 according to an embodiment.

Referring to FIG. 1, the composite anode active material 10 includes a core 11 and a carbonaceous shell 12.

The core 11 may be, for example, a composite of silicon 11a and carbon 11b.

The carbonaceous shell 12 may include a carbonaceous material 12a and lithium titanium oxide 12b.

The carbonaceous shell 12 may be disposed to completely surround the core 11 and/or to fill a pore inside the core 11.

Hereinafter, a method of preparing the composite anode active material, according to an embodiment, will be disclosed in further detail.

The method of preparing the composite anode active material may include a first operation to coat the core with a mixture of the carbonaceous material, the lithium titanium oxide, and, optionally, the titanium-containing oxide; and a second operation to heat treat the coated core under an inert atmosphere (e.g., a nitrogen, argon, or helium atmosphere, specifically a nitrogen atmosphere).

In an embodiment, the method of preparing the composite anode active material comprises providing a core comprising silicon; and contacting the core with a carbonaceous material and lithium titanium oxide to form a carbonaceous shell comprising the carbonaceous material and the lithium titanium oxide on the core to prepare the composite anode active material.

The heat treatment process of the second operation may be performed at a temperature of about 400° C. to about 700° C. (e.g., 600° C.) for about 1 hour to about 24 hours (e.g., 12 hours).

Hereinafter, an anode according to an embodiment will be disclosed in further detail.

The anode includes the composite anode active material described above.

The anode may further include an additional anode active material that suitable for use in a lithium secondary battery, in addition to the composite anode active material described above.

Examples of the additional anode active material includes a carbonaceous material which is capable of intercalating and deintercalating lithium ions, e.g., at least one selected from carbon nanotubes (CNTs), carbon nanofibers, graphene, graphite, and carbon; lithium metal; an alloy of lithium metal; and a silicon oxide-based material.

The anode may further include a binder and/or a conductive agent, in addition to the composite anode active material and the additional anode active material described above.

The binder may improve binding between components, e.g., the composite anode active material and the additional anode active material and the conductive agent, and binding of an anode to a current collector. Examples of the binder include at least one selected from polyacrylic acid (PAA), polyvinylidenefluoride, polyvinylalcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene monomer (EPDM), sulfonated EPDM, styrene butadiene rubber, a fluororubber, and a copolymer comprising a unit of any of the foregoing.

The binder may include lithium ions.

The amount of the binder may be in the range of about 1 part by weight to about 20 parts by weight, for example, or about 2 parts by weight to about 7 parts by weight, with respect to a total weight (100 parts by weight) of the composite anode active material and the additional anode active material. When the amount of the binder is within the ranges described above, e.g., from about 1 part by weight to about 20 parts by weight, suitably strong binding strength between a current collector and an anode may be achieved.

The conductive agent is not particularly limited so long as it does not cause an undesirable chemical change in a lithium secondary battery and has sufficient conductivity.

The conductive agent may include, for example, at least one carbonaceous conductive agent selected from carbon black, carbon fibers, and graphite (e.g., the same or different from the graphite used as the additional anode active material). For example, the carbon black may be selected from acetylene black, ketjen black, super P, channel black, furnace black, lamp black, and thermal black. The graphite may include natural graphite, artificial graphite, or a combination thereof.

The anode may further include an additional conductive agent in addition to the carbonaceous conductive agent described above.

The additional conductive agents may be selected from conductive fibers such as metallic fibers, metal powders such as carbon fluoride powder, aluminum powder and nickel powder, conductive whiskers such as zinc oxide and potassium titanate, and a polyphenylene derivative.

The amount of the conductive agent may be in the range of about 0.5 parts by weight to about 10 parts by weight, for example, about 0.01 parts by weight to about 5 parts by weight, with respect to a total weight (100 parts by weight) of the composite anode active material and the additional anode active material, if present. When the amount of the conductive agent is within the range described above (e.g., about 0.5 parts by weight to about 10 parts by weight), a finally obtained anode has suitable ionic conductivity.

The anode may be manufactured using, for example, the following method.

First, a composition for forming an anode active material layer is prepared by mixing a composite anode active material according to an embodiment, the additional anode active material if present, the binder, a solvent, and the carbonaceous conductive agent and/or the additional conductive agent if present.

Subsequently, the composition is coated onto an anode current collector and dried, thereby completing the fabrication of the anode.

The anode current collector may have a thickness of about 3 micrometers (μm) to about 500 μm. Such an anode current collector is not particularly limited so long as it does not cause an undesirable chemical change in a lithium secondary battery including the same and has suitable conductivity.

Examples of a material for forming the anode current collector include copper, stainless steel, aluminum, nickel, titanium, heat-treated carbon, copper or stainless steel that is surface-treated with carbon, nickel, titanium, silver, or the like, an alloy of aluminum and cadmium, or a combination thereof. In addition, as in a cathode current collector, the anode current collector may have pattern or roughness on a surface thereof so as to enhance adhesive strength of an anode active material to the anode current collector, and may be used in any suitable forms including a film, a sheet, a foil, a net, a porous structure, a foam, and a non-woven fabric.

The solvent may comprise at least one selected from N-methylpyrrolidone (NMP), acetone, and water. The amount of the solvent may be in the range of about 1 part by weight to about 50 parts by weight, based on 100 parts by weight of the anode active material. When the amount of the solvent is within the range described above, processes for forming an active material layer may be facilitated.

A lithium secondary battery according to an embodiment includes the anode described above.

Figure 2:
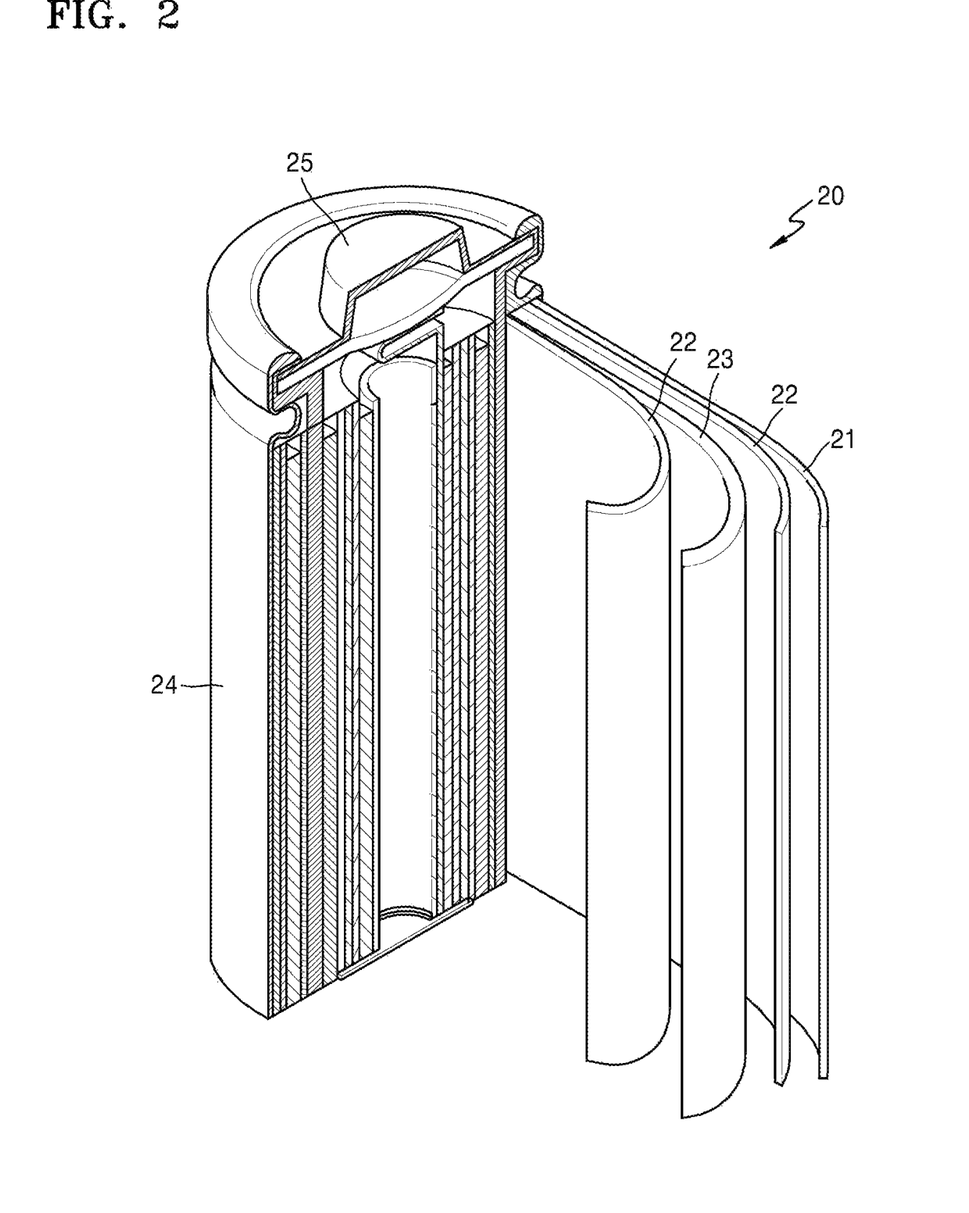
FIG. 2 is a schematic diagram of a lithium secondary battery according to an exemplary embodiment.

FIG. 2 is a schematic diagram of a lithium secondary battery 20 according to an embodiment.

Referring to FIG. 2, the lithium secondary battery 20 includes a cathode 23, an anode 21, and a separator 22.

The cathode 23, the anode 21, and the separator 22 are wound or folded to be accommodated in a battery case 24. Subsequently, an electrolyte (not shown) is injected into the battery case 24 and the battery case 24 is sealed with a cap assembly 25 to complete the manufacture of the lithium secondary battery 20. The battery case 24 may be of a coin, rectangular, or thin film type. For example, the lithium secondary battery 20 may be a large thin film-type battery.

The lithium secondary battery has improved lifespan characteristics.

Hereinafter, a method of manufacturing the lithium secondary battery, according to an embodiment, will be disclosed in further detail.

First, an anode is manufactured using the aforementioned method.

Next, a cathode is manufactured using a method that is similar to the method of manufacturing the anode described above. For example, a composition for forming a cathode active material layer is prepared by mixing a lithium transition metal oxide, a binder, a conductive agent, and a solvent. Subsequently, the composition is coated onto a cathode current collector and the coated cathode current collector is dried to complete the fabrication of the cathode.

The kinds and amounts of the binder, the conductive agent, and the solvent that are used in the composition for forming a cathode active material layer may be the same as those used in the composition for forming an anode active material layer.

The lithium transition metal oxide may be at least one selected from $LiCoO_2$, $LiNiO_2$, $LiMnO_2$, $LiMn_2O_4$, $Li(Ni_aCo_bMn_c)O_2$ where $0<a<1$, $0<b<1$, $0<c<1$, and $a+b+c=1$, $LiNi_{1-Y}Co_YO_2$, $LiCo_{1-Y}Mn_YO_2$, $LiNi_{1-Y}Mn_YO_2$ where $0≤Y<1$, $LiMn_{2-Z}Ni_ZO_4$, $LiMn_{2-Z}Co_ZO_4$ where $0<Z<2$, $LiCoPO_4$, and $LiFePO_4$.

The cathode current collector may have a thickness of about 3 μm to about 500 μm. The cathode current collector is not particularly limited so long as it does not cause an undesirable chemical change in a lithium secondary battery including the same and has suitable conductivity. Examples of a material for forming the cathode current collector include stainless steel, aluminum, nickel, titanium, heat-treated carbon, and aluminum or stainless steel that is surface-treated with carbon, nickel, titanium, silver, or the like. In addition, the cathode current collector may have a pattern or roughness on a surface thereof so as to enhance adhesive strength of a cathode active material to the cathode current collector, and may be used in any of various forms including a film, a sheet, a foil, a net, a porous structure, a foam, and a non-woven fabric.

A separator is interposed between the cathode and anode manufactured according to the processes described above and an organic liquid electrolyte is injected thereinto, thereby completing the manufacture of the lithium secondary battery.

The lithium secondary battery described above may be manufactured by, for example, sequentially stacking the anode, the separator, and the cathode, winding or folding the stacked structure to be accommodated in a coin or rectangular type battery case or pouch, and injecting an organic liquid electrolyte into the battery case or pouch.

The separator may have a pore diameter of about 0.01 μm to about 10 μm and generally have a thickness of about 5 μm to about 300 μm. Examples of the separator include sheets or non-woven fabrics made of an olefin-based polymer, e.g., polypropylene, polyethylene, or the like, or glass fibers.

The organic liquid electrolyte may take a form in which a lithium salt is dissolved in a medium.

The medium may comprise at least one selected from propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, and dimethylether.

The lithium salt may comprise at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are natural numbers, LiCl, and LiI.

In a lithium secondary battery according to another embodiment, an organic solid electrolyte and/or an inorganic solid electrolyte may be used together in addition to the organic liquid electrolyte. As such, when the organic solid electrolyte and/or the inorganic solid electrolyte are used, in some embodiments, the solid electrolyte(s) may also serve as a separator and thus the separator described above may not be used.

Examples of the organic solid electrolyte include, but are not limited to, polyethylene derivatives, polyethylene oxide derivatives, polypropylene oxide derivatives, phosphoric acid ester polymers, polyester sulfide, polyvinyl alcohols, and polyvinylidene fluoride.

Examples of the inorganic solid electrolyte include $Li_4SiO_4$, and/or nitrides, halides, and/or sulfides of lithium such as $Li_3N$, LiI, $Li_5NI_2$, $Li_3N$—LiI—LiOH, $Li_2SiS_3$, $Li_4SiO_4$—LiI—LiOH, and $Li_3PO_4$—$Li_2S$—$SiS_2$.

The lithium secondary battery may be used as a microbattery for power sources of portable devices such as mobile phones, personal digital assistants (PDAs), and portable multimedia players (PMPs); power sources of motor-driven devices such as high-output hybrid vehicles and electric vehicles; power sources of flexible display devices such as e-inks, e-papers, flexible liquid crystal displays (LCDs), and flexible organic light emitting diodes; and power sources of integrated circuit devices on printed circuit boards (PCBs).

Hereinafter, one or more embodiment will be described in further detail with reference to the following examples. However, these examples are not intended to limit the scope of the one or more embodiments.

EXAMPLES

Example 1 and Comparative Example 1

(Preparation of Anode Active Material Composition)

Si particles (manufactured by Sigma Aldrich) having an average diameter of 15 nanometers (nm), barium titanate ($Li_4Ti_5O_{12}$) (manufactured by Samsung Fine Chemicals) having an average diameter of 150 nm, graphite (manufactured by Mitsubishi) having an average diameter of 16 micrometers (μm), and polyacrylonitrile (PAN) as a binder were mixed in a mixing ratio shown in Table 1 below. To adjust viscosity, N-methylpyrrolidone as a solvent was added so that the solid content became 60 wt %, thereby completing the preparation of an anode active material composition.

TABLE 1

|  | Example 1 | Comparative Example 1 |
| --- | --- | --- |
| Si particles (parts by weight) | 13.3 | 5.7 |
| $Li_4Ti_5O_{12}$ (parts by weight) | 9.5 | 0 |
| Graphite (parts by weight) | 72.2 | 89.3 |
| PAN (parts by weight) | 5 | 5 |

(Manufacture of Anode)

The anode active material composition was coated onto a copper current collector having a thickness of 15 μm to have a thickness of about 40 μm. The coated current collector was dried at room temperature (about 25° C.), followed by further drying at 120° C., and roll-pressed, thereby completing the manufacture of an anode with an anode active material layer.

(Manufacture of Lithium Secondary Battery)

The anode, a lithium metal electrode as a counter electrode, and a polypropylene separator having a thickness of 14 μm were used, an electrolyte was injected thereinto, and the resultant structure was compressed, thereby completing the manufacture of a 2032-type lithium secondary battery assembly. In this regard, a 1.10 molar (M) $LiPF_6$ solution was used as a liquid electrolyte that is dissolved in a mixed solvent, wherein the mixed solvent is a mixture of ethylene carbonate (EC), diethyl carbonate (DEC), and fluoroethylene carbonate (FEC) in a volume ratio of EC:DEC:FEC=5:70:25.

The lithium secondary battery assembly was initially charged with a current of 0.1 C rate for 10 minutes and then maintained at 25° C. for one day. Subsequently, the lithium secondary battery assembly was charged with a constant current of 0.1 C rate until the voltage reached 4.2 V. Thereafter, the lithium secondary battery assembly was discharged with a constant current of 0.1 C rate until the discharge cut-off voltage reached 1.5 V. In this regard, the charging and discharging processes are referred to as a formation process.

Subsequently, the lithium secondary battery assembly was charged with a constant current of 0.2 C rate until the voltage reached 4.3 V and charged at a constant voltage of 4.3 V until the current reached 0.05 C. Thereafter, the lithium secondary battery assembly was discharged with a constant current of 0.2 C until the discharge cut-off voltage reached 1.5 V, thereby completing the manufacture of a lithium secondary battery. In this regard, the charging and discharging processes are referred to as a rating process.

While not wanting to be bound by theory, it is understood that in the formation process, active $Li_4Ti_5O_{12}$ was converted to inert $Li_7Ti_5O_{12}$ through intercalation of lithium ions and, even in the subsequent processes, the latter state remained the same.

Example 2 and Comparative Example 2

(Preparation of Composite Anode Active Material)

A pitch (EMC10 manufactured by CR-tech) and barium titanate ($Li_4Ti_5O_{12}$) (manufactured by Samsung Fine Chemicals) were mixed at a weight ratio of 1:1 to obtain a first mixture. The first mixture and a silicon-carbon (Si—C) composite (including 70 parts by weight of silicon particles (manufactured by Aldrich, diameter: about 50 nm) and 30 parts by weight of carbon particles) were mixed at a weight ratio of 1:5 to obtain a second mixture. The second mixture was heat-treated in an electric reactor under a nitrogen atmosphere at 600° C. for 2 hours. During the heat treatment process, the pitch was softened and carbonized to form a pitch-lithium titanate composite, and the pitch-lithium titanate composite was coated onto a surface of the Si—C composite, thereby obtaining a composite anode active material including a core and a carbonaceous shell.

(Preparation of Composite Anode Active Material Composition)

95 parts by weight of the composite anode active material was mixed with 5 parts by weight of polyacrylonitrile (PAN) as a binder and, to adjust viscosity, N-methylpyrrolidone as a solvent was added thereto so that the solid content became 60 wt %, thereby completing the preparation of a composite anode active material composition.

(Manufacture of Anode and Lithium Secondary Battery)

An anode and lithium secondary battery were manufactured in the same manner as in Example 1 and Comparative Example 1, except that each of the composite anode active material compositions prepared according to Example 2 and Comparative Example 2 was used instead of each of the anode active material compositions prepared according to Example 1 and Comparative Example 1.

EVALUATION EXAMPLE

Evaluation Example 1: High-Rate Characteristics Evaluation

Figure 3:
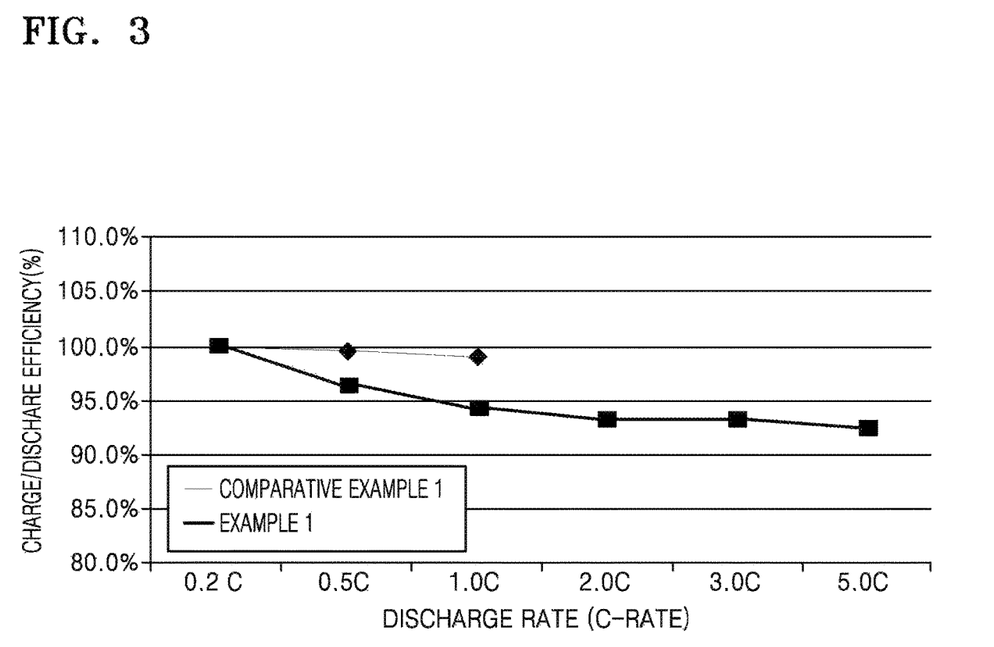
FIG. 3 is a graph of charge/discharge efficiency (percent, %) versus discharge rate (C-rate) showing changes in charge/discharge efficiency according to discharge rate of lithium secondary batteries manufactured according to Example 1 and Comparative Example 1.

Each of the lithium secondary batteries of Example 1 and Comparative Example 1 was charged with a current of 0.01 C up to a maximum operating voltage. Subsequently, each lithium secondary battery was discharged with a discharge C-rate of 0.2 C, 0.5 C, 1.0 C, 2.0 C, 3.0 C, or 5.0 C to a discharge cut-off voltage of 1.5 V. That is, this cycle of charging and discharging was repeated 6 times (a total 6 cycles) by varying discharge C-rate for each battery. The charge/discharge efficiency of each battery according to the discharge C-rate was measured and the measurement results are shown in FIG. 3. The term "C" as used herein refers to the discharge rate of a battery and indicates a value obtained by dividing the total capacity of a battery by a total discharge time of the battery. In FIG. 3, the charge/discharge efficiency is calculated by Equation 1 below:

Charge/discharge efficiency (%)=(discharge capacity in each discharging cycle)/(charge capacity in charging cycle with 0.01 C)×100%  Equation 1

Referring to FIG. 3, it is confirmed that the lithium secondary battery of Example 1 exhibits excellent high-rate characteristics as compared to the lithium secondary battery of Comparative Example 1. In particular, in the case of the battery of Comparative Example 1 including an anode excluding $Li_4Ti_5O_{12}$, it was impossible to measure a capacity retention at a C-rate greater than 1.0 C. However, the battery of Example 1 including an anode including $Li_7Ti_5O_{12}$ exhibited a capacity retention of 90% or more even at a C-rate of 5.0 C. Thus, it is confirmed from the results that, when an anode includes $Li_7Ti_5O_{12}$, a battery including the anode may have enhanced high-rate characteristics. This means that the capacity of the battery per operable time increases, and thus, it is expected that battery output characteristics are also enhanced.

Evaluation Example 2: Impedance Evaluation

Figure 4:
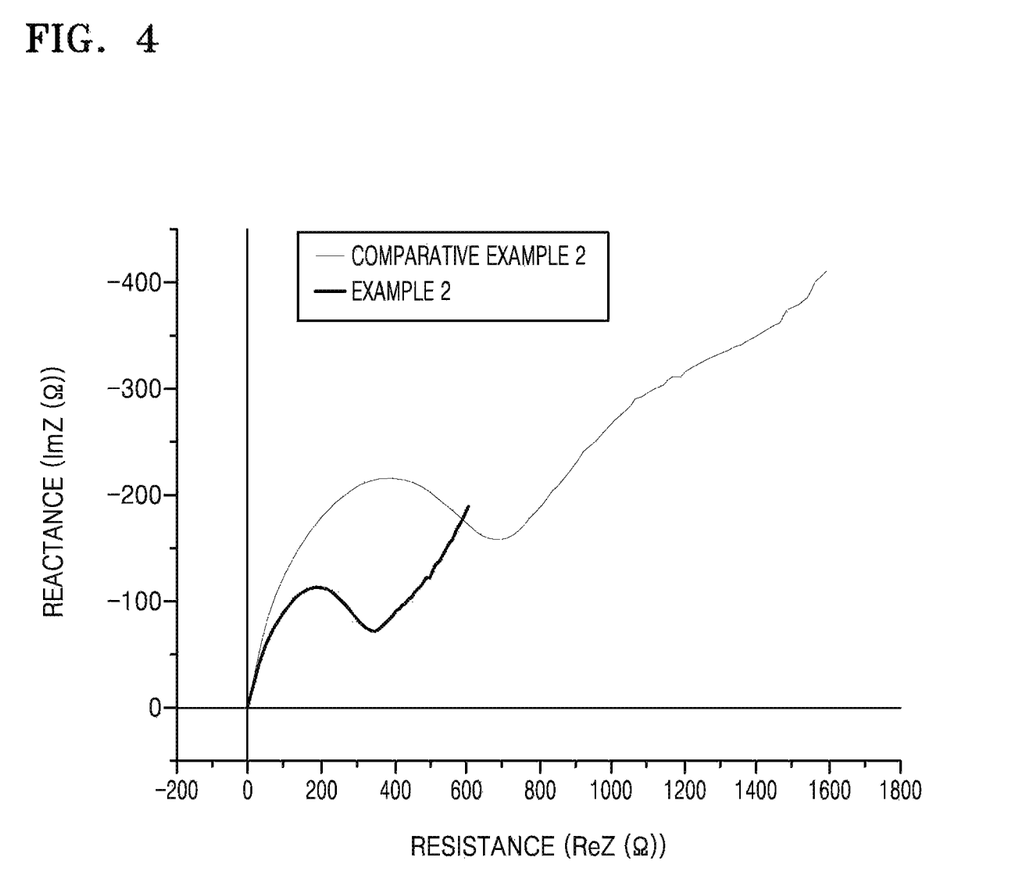
FIG. 4 is a graph of reactance (ImZ, ohms) versus resistance (ReZ, ohms) showing the results of impedance analysis of lithium secondary batteries manufactured according to Example 2 and Comparative Example 2.

Impedances of the lithium secondary batteries of Example 2 and Comparative Example 2 were measured using PARSTAT 2273 according to a 2-probe method. A frequency range was between $10^5$ Hz and $10^{-1}$ Hz. Niquist plots obtained by the impedance measurement are illustrated in FIG. 4. In FIG. 4, Re Z denotes resistance, and Im Z denotes reactance.

Referring to FIG. 4, it is confirmed that the lithium secondary battery of Example 2 has a lower impedance than the lithium secondary battery of Comparative Example 2. This is attributed to, when discharging is cut off at 1.5 V, $Li_4Ti_5O_{12}$ existing in the form of $Li_7Ti_5O_{12}$ formed by intercalation of lithium ions thereinto, which leads to serve as an ion conductor and a conductive agent without intercalation and deintercalation of lithium ions even during subsequent repeated charging and discharging processes.

Evaluation Example 3: Lifespan Characteristics Evaluation

Each of the lithium secondary batteries of Example 2 and Comparative Example 2 was charged with a constant current of 0.5 C-rate at 25° C. until the voltage reached 4.3 V and then charged at a constant voltage of 4.3 V until the current reached 0.05 C. Subsequently, each lithium secondary battery was discharged with a constant current of 1 C, 2 C, or 3 C until the voltage reached 1.5 V and this cycle of charging and discharging was repeated 20 times.

Figure 5A:
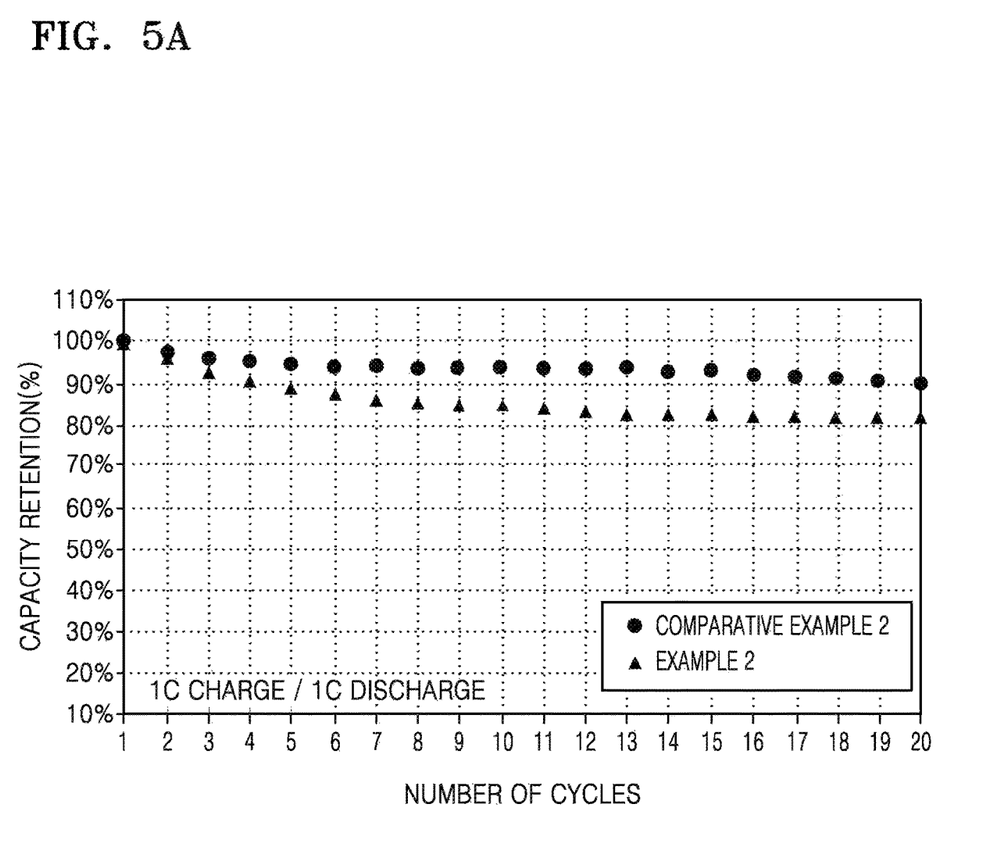
FIG. 5A is a graph of capacity retention (%) versus number of cycles under conditions of 1 C charging/1 C discharging of the lithium secondary batteries of Example 2 and Comparative Example 2.
Figure 5B:
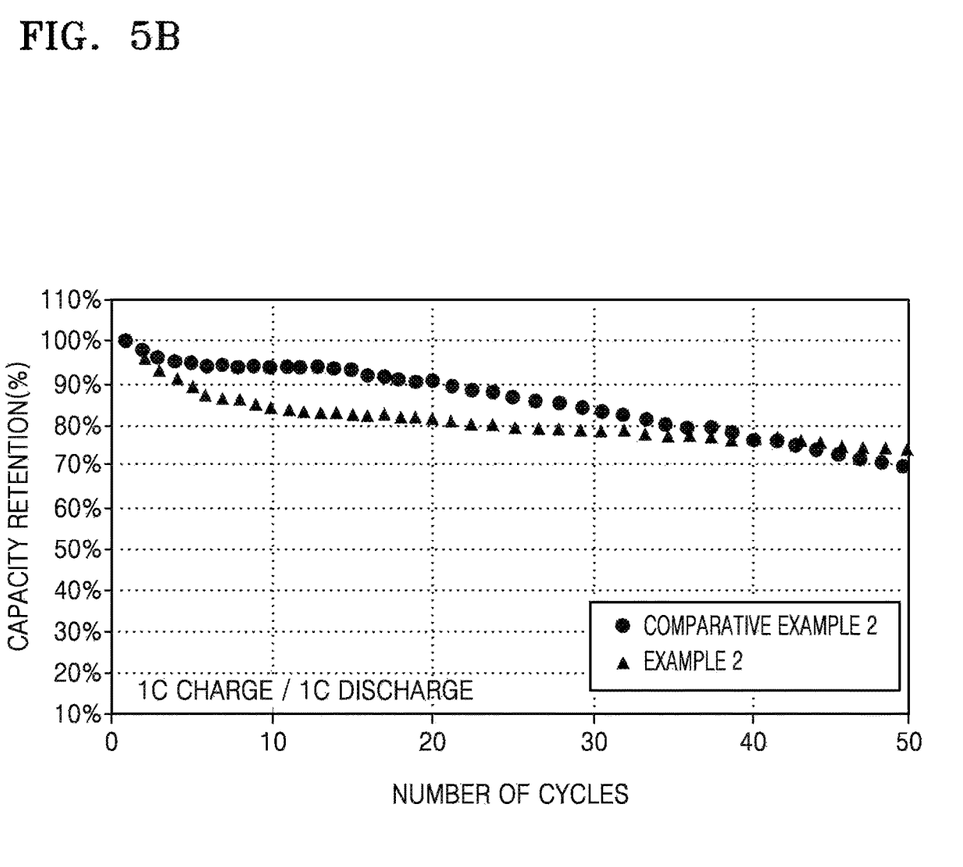
FIG. 5B is a graph capacity retention (%) versus number of cycles obtained by extending the graph of FIG. 5A up to $50^{th}$ cycle by linear extrapolation.

The capacity retention (CR) of each lithium secondary battery was measured and the measurement results are shown in FIGS. 5A, 5B, 6 and 7. FIG. 5B is a graph obtained by extending the graph of FIG. 5A up to the $50^{th}$ cycle by linear extrapolation. In this regard, the capacity retention is calculated by Equation 2 below:

Capacity retention (%)=(discharge capacity in each cycle/discharge capacity in the $1^{st}$ cycle)×100%  Equation 2

Referring to FIGS. 5A and 5B, it is confirmed that, in low-rate lifespan evaluation (i.e., 1 C charging/1 C discharging), the lithium secondary batteries of Example 2 and Comparative Example 2 exhibit reversed capacity retentions in the vicinity of the $45^{th}$ cycle. That is, the lithium secondary battery of Example 2 has a lower capacity retention than the lithium secondary battery of Comparative Example 2 prior to the $45^{th}$ cycle, while the lithium secondary battery of Example 2 has a higher capacity retention than the lithium secondary battery of Comparative Example 2 after the $45^{th}$ cycle.

Figure 6:
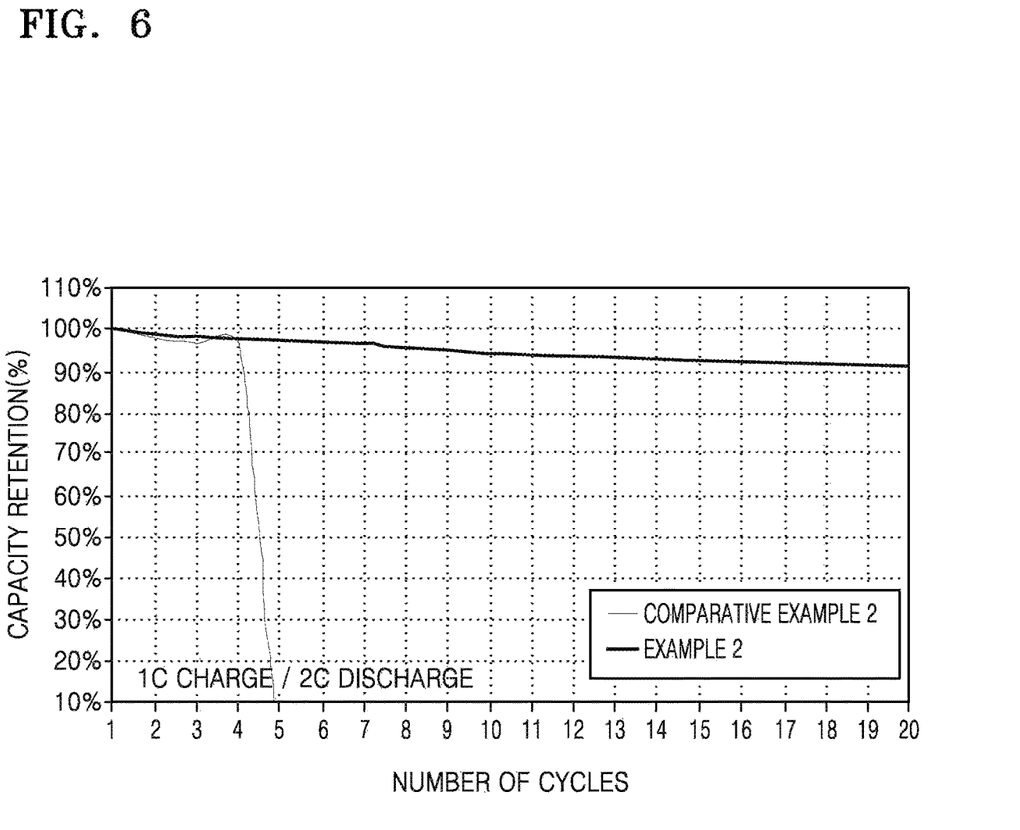
FIG. 6 is a graph of capacity retention (%) versus number of cycles showing changes in capacity retention under conditions of 1 C charging/2 C discharging of the lithium secondary batteries of Example 2 and Comparative Example 2.

Referring to FIG. 6, it is confirmed that, in high-rate lifespan evaluation (i.e., 1 C charging/2 C discharging), the lithium secondary battery of Example 2 maintains a capacity retention of 90% or more up to the $20^{th}$ cycle, while the lithium secondary battery of Comparative Example 2 exhibits a sharply reduced capacity retention after the 4$^{th}$ cycle.

Figure 7:
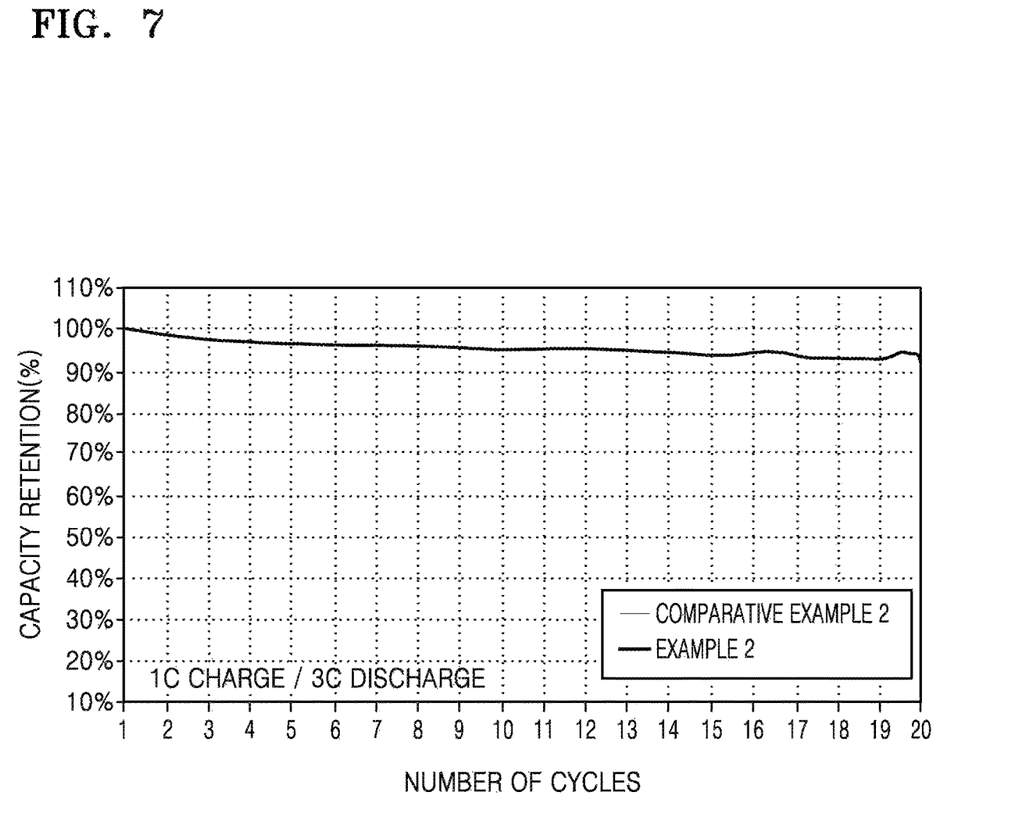
FIG. 7 is a graph of capacity retention (%) versus number of cycles showing changes in capacity retention under conditions of 1 C charging/3 C discharging of the lithium secondary batteries of Example 2 and Comparative Example 2.

In addition, referring to FIG. 7, it is confirmed that, in high-rate lifespan evaluation (i.e., 1 C charging/3 C discharging), the lithium secondary battery of Example 2 maintains a capacity retention of 90% or more up to 20$^{th}$ cycle, while the lithium secondary battery of Comparative Example 2 exhibits a very low capacity retention, i.e., 0 or nearly 0.

As is apparent from the foregoing description, a composite anode active material according to an embodiment includes lithium titanium oxide that imparts ionic conductivity to a carbonaceous shell, and thus, an irreversible reaction of an active material according to repeated charging and discharging of a battery including the composite anode active material is suppressed, and accordingly, rapid lifespan deterioration of the battery may be suppressed. Thus, a lithium secondary battery with excellent lifespan characteristics may be obtained.

It should be understood that the exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite anode active material comprising:
   a core comprising silicon, wherein the core has a porosity of about 1% to about 10%; and
   a carbonaceous shell,
   wherein the carbonaceous shell comprises a carbonaceous material and a lithium titanium oxide represented by Formula 1

$$Li_{x+3}Ti_yO_{12} \qquad \text{Formula 1}$$

wherein 2.4≤x≤4.2 and 4.8<y<6.6, and
   wherein the lithium titanium oxide of Formula 1 is inert to oxidation or reduction between 1 volt to 4.3 volts versus Li/Li$^+$.

2. The composite anode active material of claim 1, wherein the lithium titanium oxide is dispersed in the carbonaceous material.

3. The composite anode active material of claim 1, wherein the core comprises at least one of Si, SiO$_x$ where 0<x<2, a Si—C composite, or a Si alloy.

4. The composite anode active material of claim 3, wherein the Si alloy comprises at least one of Fe$_3$Si, Fe$_2$Si, Fe$_5$Si$_3$, FeSi, FeSi$_2$, FeSi$_3$, AlSi$_2$, Cu$_5$Si, Mg$_2$Si, NiSi, TiSi$_2$, or Si$_7$Ti$_4$Ni$_4$.

5. The composite anode active material of claim 1, wherein the lithium titanium oxide of Formula 1 has an electrical conductivity of at least 10 Siemens per meter.

6. The composite anode active material of claim 1, wherein the lithium titanium oxide comprises Li$_7$Ti$_5$O$_{12}$.

7. The composite anode active material of claim 1, wherein the carbonaceous shell further comprises a titanium-containing compound represented by Formula 4:

$$Ti_yM_zO_n \qquad \text{Formula 4}$$

wherein 1≤y≤2, 0≤z≤2, 1≤n≤7, and
   M is at least one of Li, Mg, Al, Ca, Sr, Cr, V, Fe, Co, Ni, Zr, Zn, Si, P, S, Y, Nb, Ga, Sn, Mo, W, Ba, La, Ce, Ag, Ta, Hf, Ru, Bi, Sb, or As.

8. The composite anode active material of claim 7, wherein the titanium-containing compound comprises at least one of TiO$_2$, TiSO$_5$, or TiP$_2$O$_7$.

9. The composite anode active material of claim 1, wherein the carbonaceous material comprises at least one of crystalline carbon or amorphous carbon.

10. The composite anode active material of claim 1, wherein an amount of the carbonaceous shell is in a range of about 0.1 parts by weight to about 50 parts by weight, with respect to 100 parts by weight of the core.

11. The composite anode active material of claim 1, wherein an amount of the lithium titanium oxide is in a range of about 0.1 parts by weight to about 50 parts by weight, with respect to 100 parts by weight of the carbonaceous material.

12. An anode comprising the composite anode active material according to claim 1.

13. The anode of claim 12, wherein the anode further comprises an additional anode active material.

14. A lithium secondary battery comprising the anode according to claim 12.

15. A method of preparing a composite anode active material, the method comprising:
   providing a core comprising silicon, wherein the core has a porosity of about 1% to about 10%; and
   contacting the core with a carbonaceous material and a lithium titanium oxide to form a carbonaceous shell comprising the carbonaceous material and the lithium titanium oxide on a surface of the core; and
   intercalating lithium into the lithium titanium oxide to prepare the composite anode active material, wherein the intercalated lithium titanium oxide comprises a compound represented by Formula 1

$$Li_{x+3}Ti_yO_{12} \qquad \text{Formula 1}$$

wherein 2.4≤x≤4.2 and 4.8<y<6.6,
   wherein the lithium titanium oxide of Formula 1 is a product of lithium intercalation of a lithium titanate of Formula 2 at 4.2 volts versus Li/Li$^+$ or greater $$Li_xTi_yO_{12} \qquad \text{Formula 2}$$

wherein 2.4≤x≤4.2 and 4.8<y≤6.6.

16. A method of protecting a silicon anode material, the method comprising:
   providing a composite anode material comprising
      a core comprising silicon, wherein the core has a porosity of about 1% to about 10%, and
      a carbonaceous shell comprising a carbonaceous material and lithium titanium oxide; and
   intercalating lithium into the lithium titanium oxide to form an inert material on a surface of the core to protect the silicon anode material,
   wherein the lithium titanium oxide comprises a compound represented by Formula 1

$$Li_{x+3}Ti_yO_{12} \qquad \text{Formula 1}$$

wherein 2.4≤x≤4.2 and 4.8<y<6.6,
   wherein the lithium titanium oxide of Formula 1 is a product of lithium intercalation of a lithium titanate of Formula 2 at 4.2 volts versus Li/Li$^+$ or greater $$Li_xTi_yO_{12} \qquad \text{Formula 2}$$

wherein 2.4≤x≤4.2 and 4.8<y≤6.6.

17. The method of claim 16, wherein the compound represented by Formula 1 is Li$_7$Ti$_5$O$_{12}$.

* * * * *